July 3, 1923.
E. A. JOHNSON
TIRE
Filed May 13, 1919
1,460,588
2 Sheets-Sheet 1
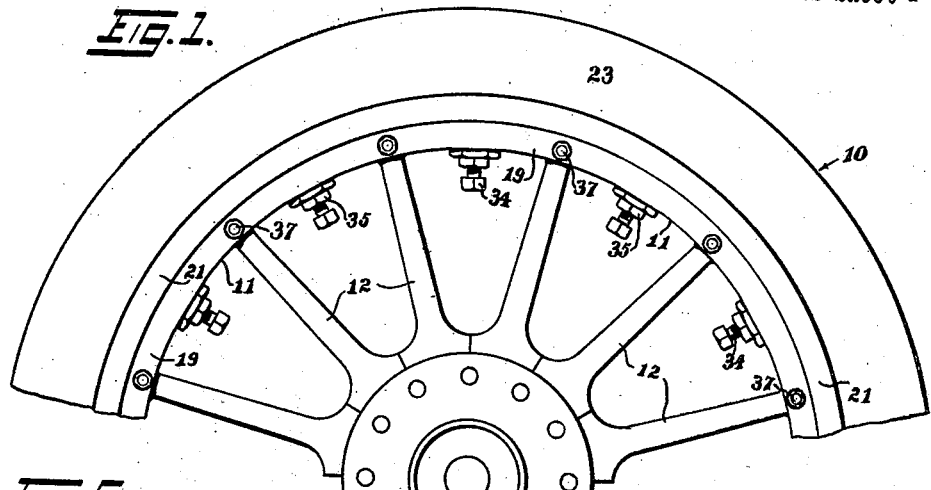
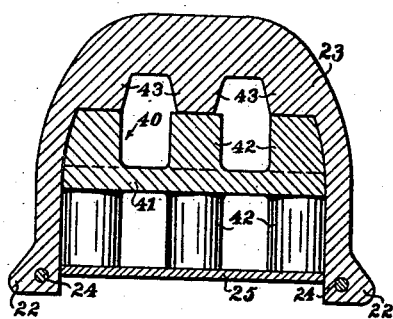
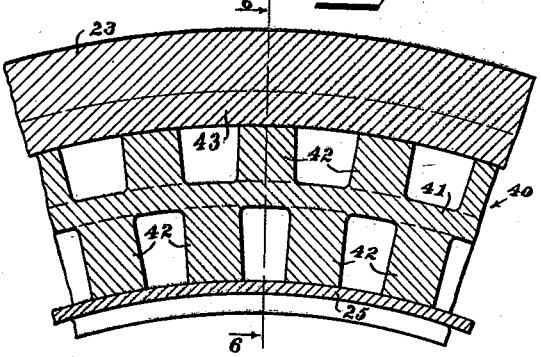
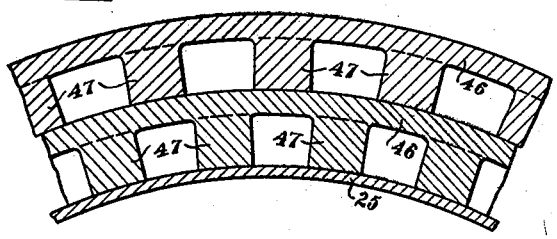
Witnesses:
Inventor:
Edward A. Johnson.
By his Atty,

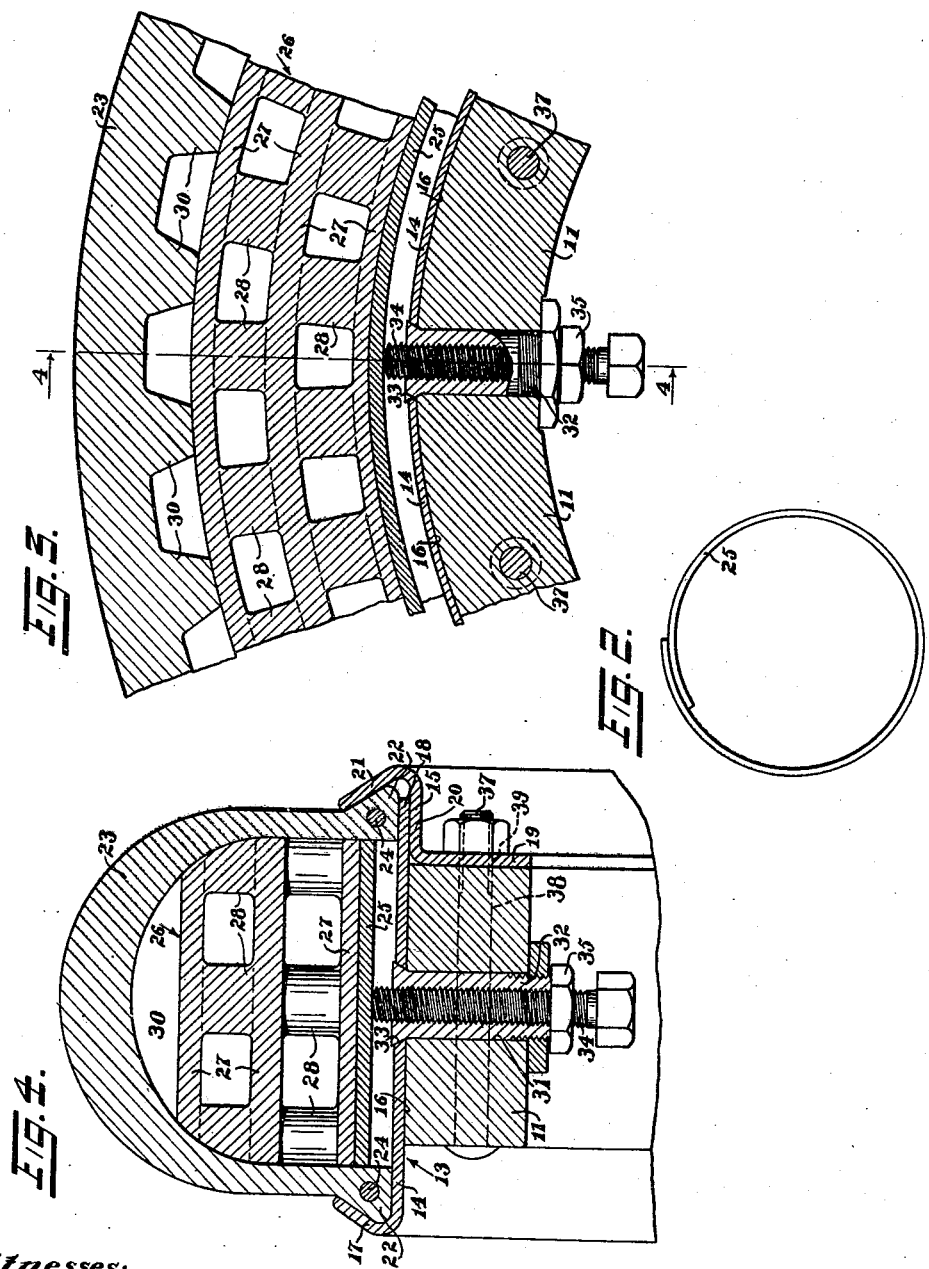

Patented July 3, 1923.

1,460,588

UNITED STATES PATENT OFFICE.

EDWARD A. JOHNSON, OF BROOKLYN, NEW YORK.

TIRE.

Application filed May 13, 1919. Serial No. 296,808.

*To all whom it may concern:*

Be it known that I, EDWARD A. JOHNSON, a citizen of the United States, residing in Brooklyn, in the county of Kings and State of New York, have invented certain new and useful Improvements in Tires, of which the following is a specification.

This invention relates to tires in general and more particularly to tires provided with fillers adapted to give the required body and cushion to the tires.

The present invention contemplates a tire having a filler that may be produced at low cost, that can be quickly inserted in place and again replaced when desired, and that can furthermore be adjusted to the desired rigidity with great facility.

Still another object of the present invention is the provision of a tire, the several parts of which can be produced at low cost, and that can be quickly assembled and disassembled when desired.

The present invention still further contemplates a tire having a shoe or casing, a cellular filler and a filler adjusting means disposed in said casing, and a sectional rim on which said casing, filler and filler adjusting means are mounted, said rim having securing jaws which are laterally removable relative to one another for clamping the side walls of the shoe against the filler and filler adjusting means and thereby anchoring the same in place.

A particular feature of the present invention is the provision of the one-piece adjustable member comprising an expansible split ring, the ends of which overlap.

These and other features, capabilities and advantages of the invention will appear from the subjoined detail description of certain embodiments thereof illustrated in the accompanying drawings in which—

Figure 1 is a side elevation of a portion of a wheel equipped with one form of the present invention.

Fig. 2 is an elevation of a part of the adjusting means.

Fig. 3 is a longitudinal section of a tire made according to one form of the present invention.

Fig. 4 is a cross-section on the line 4—4 of Fig. 3.

Fig. 5 is a longitudinal section of a tire made according to another form of the present invention.

Fig. 6 is a cross-section on the line 6—6 of Fig. 5.

Fig. 7 is a longitudinal section of a tire made according to still another form of the present invention.

In Fig. 1, there is shown a wheel 10, having the felloe 11 and spokes 12. On the felloe 11 is mounted the sectional rim 13 comprising the main portion 14 and the securing portion 15, Figs. 3 and 4. The main portion 14 has a base 16 in contact with the outer periphery of the felloe 11 and in width extends beyond the sides of the felloe 11. One of the overhanging sides of the main portion 14 is bent over to form an annular claw or gripping member 17 while the other side 18 remains flat and serves to co-operate with the securing portion 15. The securing portion 15 has an annular lateral portion 19 to rest against the side of the felloe 11, an annular flange portion 20 extending at right angles to the portion 19 and along the lower side of the overlapping portion 18 and terminating in an annular claw or gripping member 21 to cooperate with the overhanging portion 18 of the main portion 14. The claw members 17 and 21 incline outwardly from the periphery of the felloe 11 and axially towards one another and receive conformably the clencher members or outwardly extending edges 22 of the shoe 23 for retaining the shoe on the felloe, said members or edges exerting wedging pressure on the claw members. The clencher members or wedge-shaped inner edges 22 are each provided with an annular reinforcing rod 24, preferably wire, to cooperate in the manner hereinafter to be described.

Interiorly of the shoe 23 the adjusting means or band 25 and the filler 26 are located the filler 26 resting on the outer periphery of the band 25. The adjusting means or band 25 comprises essentially a flat spring-tempered metallic band constituting a split band, the ends of which overlap and are adapted to ride over one another in the course of adjustment. The filler 26 is a cellular member and comprises a plurality of concentric flexible layers 27 preferably composed of rubber or the like, spaced from one another by a plurality of spacing members such as the plugs 28 also preferably composed of rubber or the like. In the embodiment illustrated in Figs. 1, 3 and 4 there are three layers 27, an outer, an intermediate and an inner layer, the outer layer being towards the tread of the shoe, which layers conform to the interior of the shoe 23 and are secured to the plugs 28 preferably by vulcanization. The plugs 28 between adjacent layers are arranged in a plurality of rows of plugs, three plugs to a row, the rows of plugs 28 extending from one side of the intermediate layer being staggered relative to the rows of plugs extending from the other side of said intermediate layer.

Preferably as shown in Figs. 1, 3 and 4 the inner wall of the shoe 23 has plugs 30 extending inwardly to contact with the outermost layer 27, the plugs 30 in the present instance extending axially relative to the shoe 23.

The felloe 11, is provided with a series of openings 31 to receive the sleeves 32 which extend through openings 33 in the main portion 14, of the sectional rim 13, registering with the openings 31 in the felloe. These sleeves 32 are interiorly threaded to receive the bolts 34 having lock nuts 35 formed on their inwardly extending ends while their outwardly extending ends engage the adjusting band 25 and serve to press the same outwardly when desired thereby in turn to press the filler the desired degree into the shoe 23. When so pressing outwardly, it will be seen from Fig. 4 that the band 25 will be located outwardly of the reinforcing rods 24 and thus tend to impinge the wedge-shaped inner edges 22 of the shoe against the free inwardly extending edges of the claw members 17 and 21 outwardly of said reinforcing rods 24.

For locating the securing portion 15 in place and thereby co-operating to anchor the clenchers of the shoe 23 in place, the bolts 37 are provided, which bolts extend through registering openings 38 and 39 formed in the felloe 11 and securing portion 15 respectively.

In the embodiment illustrated in Figs. 5 and 6 the parts are substantially identical with those of the embodiment of Figs. 3 and 4 with the exception of the filler. The filler in the present embodiment designated by reference numeral 40 comprises essentially a single layer 41 having a plurality of rows of plugs 42 extending from either side thereof in staggered relation to one another, the inwardly extending plugs engaging the adjusting band directly, while the outwardly extending plugs engage the shoe directly. In this embodiment intead of plugs formed on the interior wall of the shoe, a series of ribs 43 are formed on such shoe to register with and engage the outwardly extending plugs 42.

In Fig. 7 still another form of filler is illustrated which comprises essentially a series of layers 46 each having a series of rows of plugs 47 extending from one side thereof to engage the plane surface of an adjacent layer. Obviously according to the dimensions of the layers and shoe respectively a greater or less number of layers are provided.

It is obvious that various changes and modifications may be made to the details of construction without departing from the spirit of the invention, or exceeding the scope of the appended claims.

I claim:

1. In combination, a shoe having on its inner face a plurality of spaced plugs; and a filler disposed in said shoe comprising outer, intermediate and inner layers and having spacing plugs located between the outer and intermediate layers and located between the intermediate and inner layers.

2. In combination, a shoe having on its inner face a plurality of spaced plugs; and a filler disposed in said shoe comprising outer, intermediate and inner layers, and provided with a plurality of spacing plugs disposed between the outer and intermediate layers and between the intermediate and inner layers; the plugs between the outer and intermediate layers of the filler being arranged in staggered relation to said plugs on the face of the shoe.

3. A shoe having on its inner face a plurality of spaced plugs; and a filler disposed in said shoe comprising outer, intermediate and inner layers, and provided with a plurality of spacing plugs disposed between the outer and intermediate layers and between the intermediate and inner layers; the plugs between the outer and intermediate layers and between the intermediate and inner layers being arranged in staggered relation to each other.

4. In combination, a shoe having a plurality of spaced plugs on its inner face; a filler disposed in said shoe comprising outer, intermediate and inner layers having spacing plugs between the layers; the plugs located between the outer and intermediate layers being in staggered relation to the plugs of the shoe, and the plugs located between the intermediate and inner layers being in staggered relation to the plugs located between the outer and intermediate layers.

5. In combination, a tire shoe having on its inner face a plurality of spaced plugs; and a filler disposed in said shoe comprising outer, intermediate and inner layers, and provided with a plurality of spacing plugs between the outer and intermediate layers and between the intermediate and inner layers; the spaces between the plugs of the shoe, when the tire is viewed in longitudinal section, being in the line of the plugs located between the outer and intermediate layers of the filler, and the spaces between the plugs located between the outer and intermediate layers of the filler being in line of the plugs located between the intermediate and inner layers of the filler; said spaces of the shoe and filler providing air space for cushioning said shoe.

6. In combination, a wheel having a felloe; a shoe having on its inner face a plurality of spaced plugs; a filler disposed in said shoe comprising outer, intermediate and inner layers and provided with a plurality of spacing plugs located between the outer and intermediate layers and located between the intermediate and inner layers; a band arranged in said shoe the edges of the band engaging the interior sides of the shoe and the outer face of the band engaging the inner layer of the filler; and means operatively connected to said felloe and engaging said band for expanding the band and compressing the filler.

EDWARD A. JOHNSON.